United States Patent [19]

Hyodo

[11] Patent Number: 4,779,880
[45] Date of Patent: Oct. 25, 1988

[54] FOUR-WHEEL STEERING SYSTEM IN WHEELED VEHICLE

[75] Inventor: Youichi Hyodo, Okazaki, Japan

[73] Assignee: Toyota Jidosha Kabushiki Kaisha, Aichi, Japan

[21] Appl. No.: 126,264

[22] Filed: Nov. 27, 1987

[30] Foreign Application Priority Data

Nov. 26, 1986 [JP] Japan .................................. 61-281469
Nov. 26, 1986 [JP] Japan .................................. 61-281470
Dec. 18, 1986 [JP] Japan .................................. 61-302600

[51] Int. Cl.$^4$ ........................... B62D 5/22; B62D 3/12
[52] U.S. Cl. ...................................... 280/91; 180/140; 180/148; 74/422; 74/498; 74/839; 74/89.17
[58] Field of Search ................... 280/91; 180/148, 140; 74/60, 840, 89.17, 422, 498

[56] References Cited

U.S. PATENT DOCUMENTS

| | | | |
|---|---|---|---|
| 2,302,995 | 11/1942 | Holmes | 74/60 |
| 3,864,982 | 2/1975 | Martinozzi | 74/60 |
| 4,648,614 | 3/1987 | Hyodo | 280/91 |
| 4,691,932 | 9/1987 | Hyodo | 280/91 |

FOREIGN PATENT DOCUMENTS

61-9374 1/1986 Japan .

Primary Examiner—John J. Love
Assistant Examiner—Karin L. Ferriter
Attorney, Agent, or Firm—Parkhurst, Oliff & Berridge

[57] ABSTRACT

A four-wheel steering system in a wheeled vehicle the front wheel steering mechanism of which is drivingly interconnected to a rear wheel steering mechanism to steer the rear road wheels in either the same or the opposite direction as the front road wheels in dependence upon the turn-angle of the steering wheel of the vehicle. In the steering system, the rear wheel steering mechanism includes an operation rod operatively connected at the opposite ends thereof to the rear road wheels, and a connecting mechanism is assembled in combination with the rear wheel steering mechanism for effecting axial displacement of the operation rod in response to operation of the front wheel steering mechanism and for controlling the displacement direction of the operation rod in dependence upon the turn-angle of the steering wheel.

11 Claims, 10 Drawing Sheets

FOUR-WHEEL STEERING SYSTEM IN WHEELED VEHICLE

BACKGROUND OF THE INVENTION

1. Field of the Invention

The present invention relates to a steering system in a wheeled vehicle, and more particularly to a four-wheel steering system in a wheeled vehicle the front wheel steering mechanism of which is drivingly interconnected to a rear wheel steering mechanism to steer the rear road wheels in either the same or the opposite direction as the front road wheels in dependence upon the turn-angle of the steering wheel of the vehicle.

2. Description of the Prior Art

In such a four-wheel steering system as described above, a linkage such as a rotary shaft assembly is arranged in a fore-and-aft direction of the vehicle and drivingly connected at its front end to a front wheel steering mechanism to be rotated in response to operation of a steering wheel, and a connecting mechanism is assembled in combination with a rear wheel steering mechanism to drivingly connect the linkage to an operation rod of the rear wheel steering mechanism in such a manner that the operation rod is displaced in an axial direction in response to rotary motion of the linkage to steer a pair of dirigible rear road wheels in either the same or the opposite direction as a pair of dirigible front road wheels in dependence upon the turn-angle of the steering wheel.

In Japanese Patent Early Publication No. 61-9374, there has been proposed such a connecting mechanism adapted for use in combination with the rear wheel steering mechanism, wherein the connecting mechanism includes a housing mounted on a vehicle body structure for axially slidably supporting thereof an opertion rod, an input shaft rotatably mounted within the housing and in drive connection to the linkage for rotation therewith, the input shaft being integrally formed at its rear end with an eccentric shaft, a cylindrical member rotatably mounted on the eccentric shaft, the cylindrical member having a pinion formed on its front portion and an eccentric cam formed on its rear portion, a stationary cylindrical member positioned in place in the housing in surrounding relationship with the pinion, the stationary cylindrical member being formed with an internal ring gear in mesh with the pinion, a pair of vertical guide members secured to one side of the operation rod, and a slider rotatably mounted on the eccentric cam and slidably supported by the guide members to effect axial movement of the operation rod in accordance with rotary motion of the eccentric cam. In operation of the connecting mechanism, the slider is applied with a resultant force caused by revolution and rotation of the eccentric cam, and the operation rod is displaced by a lateral component of the resultant force applied thereto from the slider to steer the rear road wheels.

For application of the connecting mechanism to various kinds of vehicles, the ratio of the rear wheel steering angle relative to the front wheel steering angle can be adjusted by selection of the gear ratio between the pinion and internal ring gear and the eccentric amount of the cam. The selection of the gear ratio in a limited space is, however, restricted due to limitation of each module of the gears. For this reason, it is very difficult to define an optimum steering angle of the rear road wheels relative to the front road wheels for each performance of the vehicles. During assembly process of the connecting mechanism, it is required to couple the slider over the eccentric cam in a condition where the input shaft, the eccentric shaft, the eccentric cam and the internal ring gear are aligned at each center thereof on a common vertical line. This means that precise assembly of the component parts is required, resulting in an increase of the manufacturing cost of the mechanism.

SUMMARY OF THE INVENTION

It is, therefore, a primary object of the present invention to provide an improved connecting mechanism adapted for use in combination with the rear wheel steering mechanism, wherein an optimum steering angle of the rear road wheels relative to the front road wheels can be defined in accordance with each performance of the vehicles in a limited space without causing any difficulty in manufacturing process.

A secondary object of the present invention is to provide an improved connecting mechanism, having the above-described characteristics, wherein the component parts of the connecting mechanism can be mounted in a simple manner during assembly process thereof.

A further object of the present invention is to provide an improved connecting mechanism, having the above-described chacracteristics, wherein the steering angle of the rear road wheels can be adjusted in accordance with the turn-angle of the steering wheel in a simple construction.

A still further object of the present invention is to provide an improved connecting mechanism, having the above-described characteristics, wherein the steering angle of the rear road wheels can be adjusted in accordance with the turn-angle of the steering wheel and the vehicle speed.

According to the present invention, the primay object is attained by providing an improved connecting mechanism assembled in combination with a rear wheel steering mechanism and being drivingly connected to a front wheel steering mechanism through a linkage for effecting axial displacement of an operation rod in the rear wheel steering mechanism in response to operation of the front wheel steering mechanism and for controlling the displacement direction of the operation rod in dependence upon a turn-angle of the steering wheel. The connecting mechanism comprises a housing mounted on a vehicle body structure for axially slidably supporting thereon the operation rod, a crank shaft axially slidably and rotatably mounted within the housing and having a first end portion drivingly connected to the linkage for rotation therewith, the crank shaft having an intermediate pin portion inclined at a predetermined angle with respect to the central axis thereof, a feed mechanism assembled within the housing for effecting axial displacement of the crank shaft in accordance with rotary motion of the same, and a connecting element rotatably mounted on the inclined pin portion of the crank shaft and having a radial rod extending therefrom and operatively connected to the operation rod in such a manner as to effect axial displacement of the operation rod in response to rotary motion of the crank shaft and to control the displacement direction of the operation rod in accordance with the rotary angle of the crank shaft.

Preferably, the crank shaft is arranged to rotate about a first horizontal axis perpendicular to the longitudinal axis of the operation rod, a sector gear is pivotally mounted within the housing to rotate about a second vertical axis perpendicular to the first horizontal axis, the sector gear having a toothed portion in mesh with a rack portion formed on one side of the operation rod, and a rotor member of semi-cylindrical shape is coupled with the sector gear in such a manner as to contain the connecting element therein and pivotally mounted within the housing to rotate about the second vertical axis, the rotor member being pivotally connected with the radial rod of the connecting element to be rotated by swing movement of the connecting element.

In the connecting mechanism described above, the axial displacement amount of the operation rod caused by rotary motion of the crank shaft can be properly adjusted by alteration of the feed amount of the crank shaft per one rotation of the same and the inclined angle of the pin portion of the crank shaft. This is useful to define an optimum steering angle of the rear road wheels relative to the front road wheels in accordance with each performance of the vehicles. The alteration of the feed amount of the crank shaft and the inclined angle of the pin portion can be made even in a limited space in the housing without causing any difficulty of the feed mechanism and the crank shaft.

In the connecting mechanism, it is preferable that the feed mechanism is in the form of a feed screw mechanism which comprises a plurality of balls disposed within a spiral groove formed on the first end portion or a second end portion of the crank shaft, and a stationary ball nut mounted within the housing for axially slidably and rotatably supporting thereon the first or second end portion of the crank shaft, the ball nut having an axial bore formed with a spiral groove containing therein the balls. Alternatively, the feed mechanism may be in the form of a feed screw mechanism which comprises a stationary support member mounted within the housing for axially slidably and rotatably supporting thereon the second end portion of the crank shaft, and a radial projection integrally formed on the second end portion of the crank shaft and being slidably engaged with a spiral groove in the support member. In this case, it is desirable that the spiral groove in the support member has a first screw portion to be engaged with the radial projection of the crank shaft when it is rotated from a neutral position at an angle of less than a predetermined angle (for instance, 90°) and a second screw portion to be engaged with the radial projection of the crank shaft when it is rotated from the neutral position at an angle of more than the predetermined angle, the lead of the first screw portion being determined to be smaller than that of the second screw portion.

Furthermore, the feed mechanism may be modified in the form of a feed screw mechanism which comprises a plurality of balls disposed within a spiral groove formed on the second end portion of the crank shaft, and a ball nut coupled over the second end portion of the crank shaft for relative rotation thereto and rotatably mounted in place within the housing, the ball nut having an axial bore formed with a spiral groove containing therein the balls, and an actuator mounted on the housing for effecting rotation of the ball nut in accordance with the rotary angle of the crank shaft and the vehicle speed.

BRIEF DESCRIPTION OF THE DRAWINGS

Additional objects, features and advantages of the present invention will become more readily apparent from the following detailed description of preferred embodiments thereof when taken together with the accompanying drawings, in which.

DESCRIPTION OF THE PREFERRED EMBODIMENTS

Figure 1:
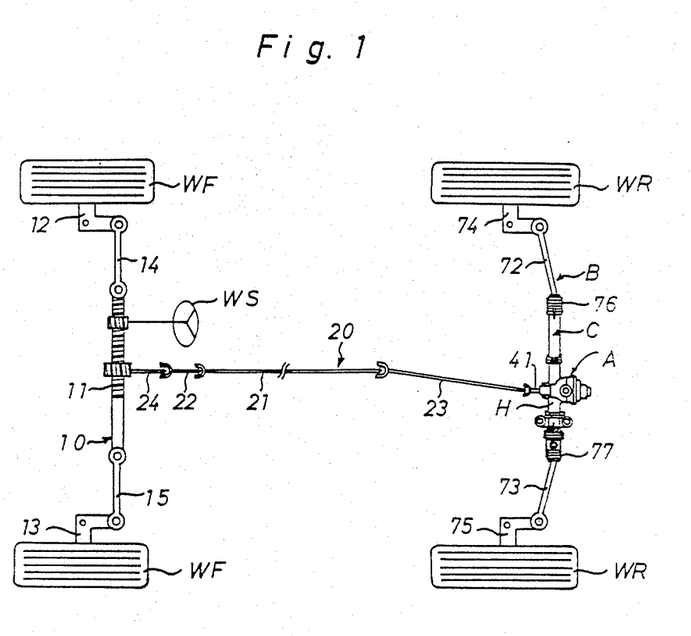
FIG. 1 is a schematic plan view of a four-wheel steering system including a connecting mechanism assembled in combination with a rear wheel steering mechanism.

Referring now to the drawings, particularly in FIG. 1, there is schematically illustrated a four-wheel steering system in a wheeled vehicle the front wheel steering mechanism 10 of which is interconnected to a rear wheel steering mechanism by means of a linkage 20. The front wheel steering mechanism 10 is in the form of a well-known steering mechanism of the rack and pinion type which includes a rack bar 11 arranged to be axially displaced by operation of a steering wheel WS, a pair of tie rods 14, 15 each connected to the opposite ends of rack bar 11 by means of a ball joint, and a pair of knuckle arms 12, 13 each connected to the tie rods 14, 15 by means of a ball joint to steer a pair of dirigible front road wheels WF in response to axial displacement of the rack bar 11. The linkage 20 includes a main rotary shaft 21 arranged in a fore-and-aft direction of the vehicle and rotatably supported on a body structure of the vehicle. The main rotary shaft 21 has a front end drivingly connected to a front pinion shaft 24 through an intermediate shaft 22 and a rear end drivingly connected through an intermediate shaft 23 to a connecting mechanism A in accordance with the present invention which is assembled in combination with the rear wheel steering mechanism. The front pinion shaft 24 is drivingly connected to the rack bar 11 to be rotated in response to axial displacement of the rack bar 11.

Figure 2:
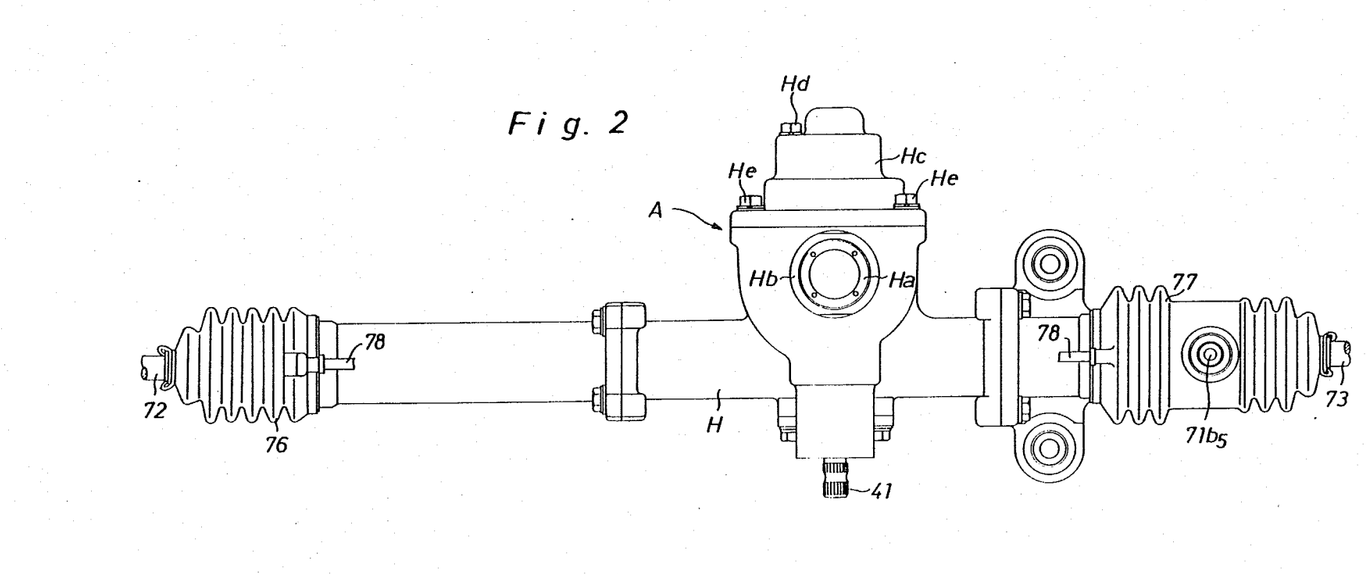
FIG. 2 is an enlarge plan view of the connecting mechanism shown in FIG. 1.
Figure 3:
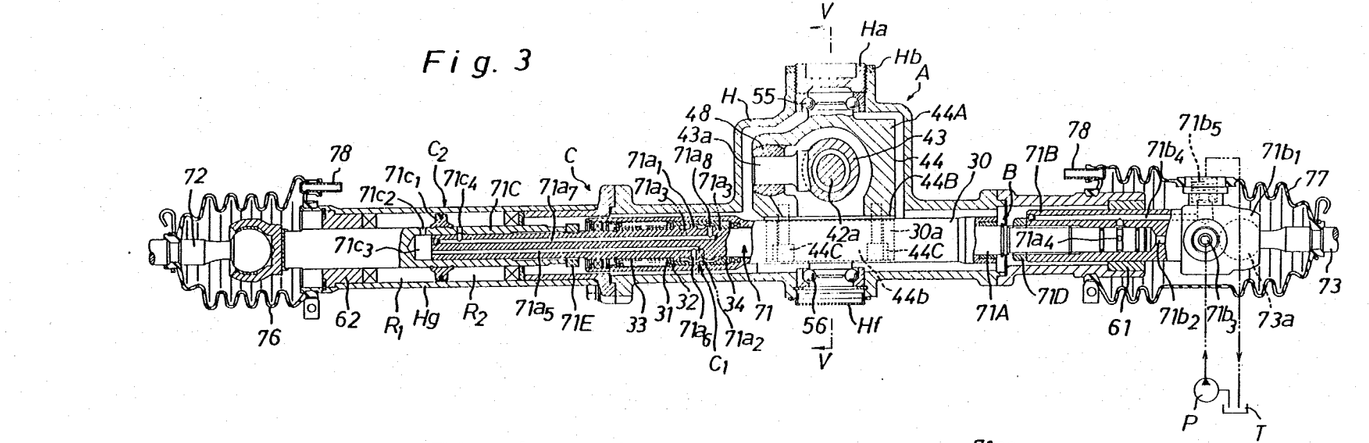
FIG. 3 is a vertical sectional view of the connecting mechanism shown in FIG. 2.
Figure 5:
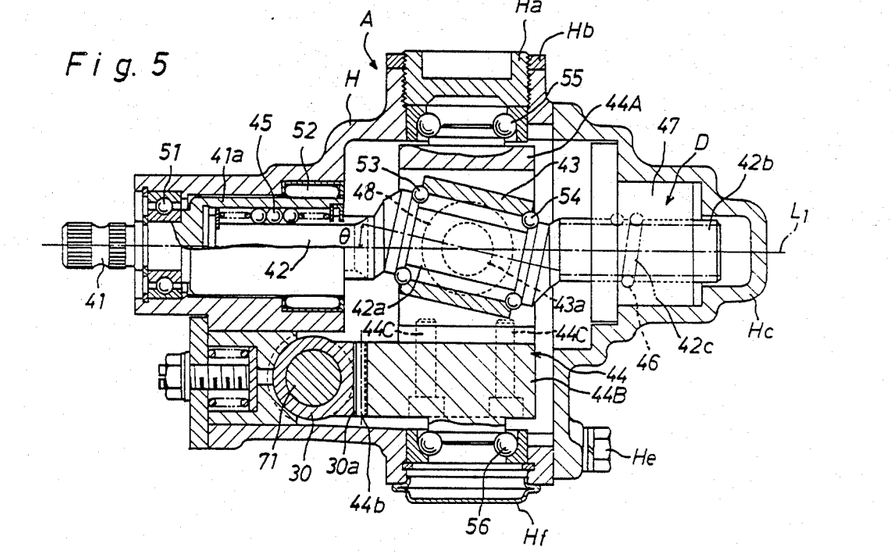
FIG. 5 is an enlarged cross-sectional view taken along line V—V in FIG. 3.
Figure 6:
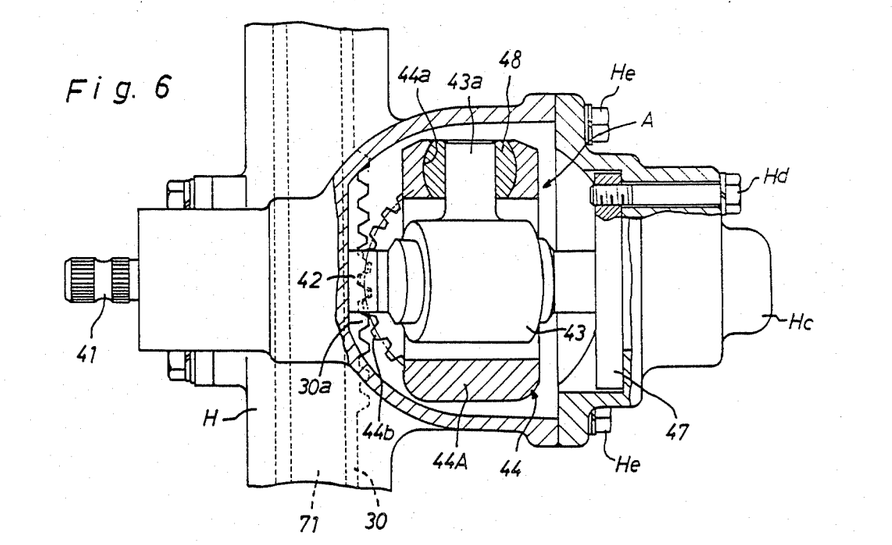
FIG. 6 is a fragmentary sectional plan view of the connecting mec-hanism shown in FIG. 5.

As shown in FIGS. 1 to 3, the rear steering mechanism includes a lateral operation rod 30 assembled therein as shown in FIG. 3, a rear wheel steering linkage B interconnecting a pair of dirigible rear road wheels WR through the operation rod 30, and a hydraulic power-assisted mechanism C assembled therein for providing a hydraulic power assist to the steering linkage B in response to axial movement of the operation rod 30. As shown in FIGS. 5 and 6, the connecting mechanism A comprises a housing H mounted on the vehicle body structure for axially slidably supporting thereon the operation rod 30, an input shaft 41 rotatably supported by a pair of axially spaced bearings 51, 52 mounted within the housing H and being arranged in drive connection to the intermediate shaft 23 of linkage 20, and a crank shaft 42 having a front end portion axially slidably coupled within a rear cylindrical portion 41a of input shaft 41 through a well-known ball spline 45 for rotation therewith. In this embodiment, the ball spline 45 is adapted to reduce sliding resistance between the input shaft 41 and the crank shaft 42.

The crank shaft 42 has an intermediate pin portion 42a which is inclined at a predetermined angle $\theta$ with respect to the central axis $L_1$ of crank shaft 42 or a horizontal axis perpendicular to the longitudinal axis of operation rod 30 and has a rear end portion 42b which is rotatably supported by a feed screw mechanism D mounted within the housing H. The feed screw mechanism D acts to cause axial displacement of the crank shaft 42 in accordance with rotary motion of the same. The feed screw mechanism D comprises a plurality of balls 46 disposed within a spiral groove 42c formed on the rear end portion 42b of crank shaft 42, and a stationary ball nut 47 coupled over the rear end portion 42b of crank shaft 42 and positioned in place within the housing H, the ball nut 47 having an axial bore formed with a spiral groove containing therein the balls 46. In this embodiment, the linkage 20 is arranged to rotate in the same direction as the steering wheel WS. For this reason, the feed screw mechanism D is in the form of a left-handed screw mechanism. In the case that the linkage 20 is arranged to rotate in a reverse direction, the feed screw mechanism D is designed in the form of a right-handed screw mechanism.

The connecting mechanism A further comprises a connecting element 43 rotatably mounted on the pin portion 42a of crank shaft 42 by means of a pair of axially spaced ball bearings 53, 54, and a rotor assembly 44 pivotally mounted within the housing H in surrounding relationship with the connecting element 43 to rotate about a vertical axis perpendicular to the central axis of crank shaft 42. The connecting element 43 has a radial rod 43a extending therefrom and pivotally connected with the rotor assembly 44 through a spherical bearing 48. The spherical bearing 48 is rotatably coupled within a corresponding spherical bore 44a in rotor assembly 44 to slidably support thereon the radial rod 43a of connecting element 43. The rotor assembly 44 includes a semi-cylindrical rotor member 44A formed to contain therein the connecting element 43, and a sector gear 44B fixedly connected with the rotor member 44A by means of four fastening bolts 44C for rotation therewith. The rotor member 44A is rotatably supported in place at its upper portion by means of a ball bearing 55, while the sector gear 44B is rotatably supported in place at its bottom portion by means of a ball bearing 56. The sector gear 44B has a toothed portion 44b in mesh with a rack portion 30a formed on one side of the operation rod 30. A holder Ha is threaded into the upper portion of housing H and fastened in place by means of a lock nut Hb to position the ball bearings 55 and 56 in place.

During assembly process of the connecting mechanism A, the input shaft 41 is coupled over the front end portion of crank shaft 42 at its rear cylindrical portion 41a through the ball spline 45, the connecting element 43 is mounted on the pin portion 42a of crank shaft 42 through the ball bearings 53, 54, and the ball nut 47 is coupled over the rear end portion 42b of crank shaft 42 through the balls 46. On the other hand, the spherical bearing 48 is coupled within the corresponding bore 44a in rotor member 44A. Thereafter, the radial rod 43a of connecting element 43 is inserted into a bore of spherical bearing 48 to combine the rotor member 44A with the crank shaft 42, and the sector gear 44B is coaxially coupled with and fixedly connected to the rotor member 44A by means of the fastening bolts 44C. At the next step, the input shaft 41 and crank shaft 42 are inserted into the interior of housing H and supported in place by means of the bearings 51 and 52 previously mounted within the housing H. Thus, the toothed portion 44b of sector gear 44B is brought into engagement with the rack portion 30a of operation rod 30 previously assembled within the housing H. In such a condition, the ball bearing 56 is coupled within the housing H and fastened in place by means of a snap ring to support the bottom portion of sector gear 44B thereon, and the ball bearing 55 is coupled within the housing H and retained in place by means of the holder Ha to support the upper portion of rotor member 44A thereon. A rear cover member Hc is coupled over the ball nut 47 previously retained in a neutral position and is fastened to the ball nut 47 by means of a bolt Hd and to the housing H by means of bolts He. Finally, the holder Ha is fastened in place by means of the lock nut Hb threaded thereon, and a cap Hf is fixedly coupled with a bottom portion of housing H to cover the ball bearing 56.

As shown in FIGS. 1 to 3, the rear wheel steering linkage B includes a relay rod 71 axially slidable in the operation rod 30, a pair of tie rods 72, 73 each connected to the opposite ends of relay rod 71 by means of a ball joint, and a pair of knuckle arms 74, 75 each connected to the tie rods 72, 73 by means of a ball joint to steer the rear road wheels WR in response to axial movement of the relay rod 71. A pair of boots 76, 77 each are fixedly coupled over the opposite ends of housing H at their one ends and over the tie rods 72, 73 at their other ends. The interior of boot 76 is communicated with the interior of boot 77 through a connecting pipe 78 to ensure smooth axial movement of the relay rod 71.

The relay rod 71 includes a first rod section 71A axially slidable in the operation rod 30, and a pair of second rod sections 71B, 71C each threadedly coupled over the opposite ends of first rod section 71A and fastened in place by means of a pair of lock nuts 71D, 71E. The second rod sections 71B, 71c are axially slidably supported by a pair of axially spaced bearing metals 61, 62 coupled within the opposite ends of housing H. The second rod section 71B is integrally formed at its outer end with a socket $71b_1$ for connection to a spherical end 73a of tie rod 73. A coil spring 31 is disposed between a pair of axially spaced sleeve-like retainers 32 and 33 which are respectively engaged with the operation rod 30 and the first rod section 71A. The coil spring 31 acts to resiliently transmit axial movement of the operation rod 30 to the relay rod 71.

Figure 4:
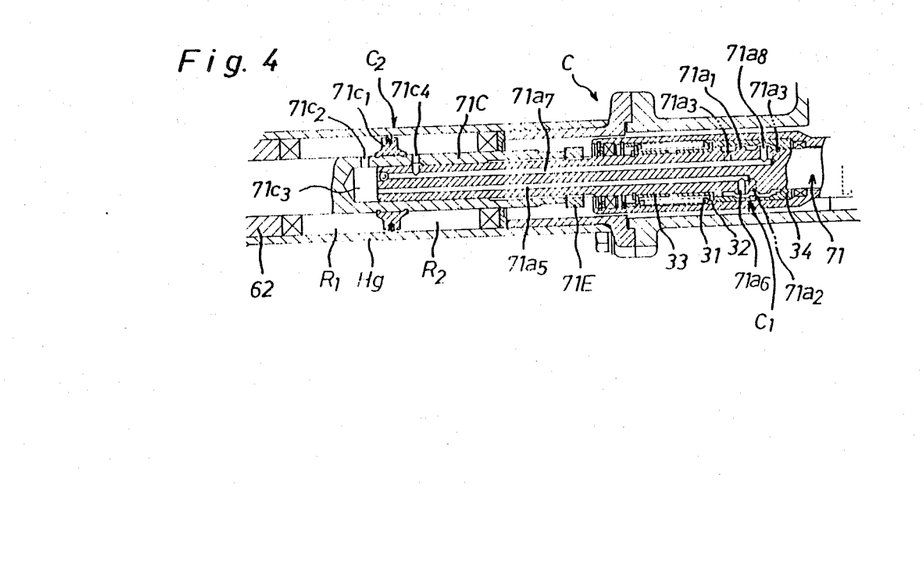
FIG. 4 is an enlarged vertical sectional view showing a changeover valve for a hydraulic power cylinder assembled in the rear wheel steering mechanism.

The hydraulic power-assisted mechanism C is assembled within the housing H to provide a hydraulic power assist to the relay rod 71 in response to axial movement of the operation rod 30. The power-assisted mechanism C includes a changeover valve $C_l$ of the spool type and a hydraulic power cylinder assembly $C_2$ combined with the housing H. The changeover valve $C_l$ comprises a valve sleeve 34 provided within the operation rod 30 and a valve spool $71a_1$ formed on a portion of first rod section 71A and surrounded by the valve sleeve 34. The valve spool $71a_1$ is formed with a supply port $71a_2$ which is connected to an inlet port $71b_3$ through an axial passage (not shown) in rod section 71A and an axial passage $71b_2$ in rod section 71B. The inlet port $71b_3$ is formed in the outer end portion of rod section 71B and connected to a hydraulic pump P driven by a prime mover of the vehicle. The valve spool $71a_1$ is further formed with exhaust ports $71a_3$ which are connected to an outlet port $71b_5$ through another axial passage (not shown) and a radial hole $71a_4$ in rod section 71A and an axial passage $71b_4$ in rod section 71B. The outlet port $71b_5$ is formed in the outer end portion of rod section 71B and connected to a fluid reservoir T.

The power cylinder assembly $C_2$ includes a cylinder body Hg integral with the housing H and a piston $71c_1$ axially slidably disposed within the cylinder body Hg to subdivide the interior of cylinder body Hg into a pair of fluid chambers $R_1$ and $R_2$. The piston $71c_1$ is fixedly mounted on the second rod section 71C. The fluid chamber $R_1$ is connected to a port $71a_6$ of valve spool $71a_1$ through a radial hole $71c_2$ and a bore $71c_3$ in rod section 71C and an axial passage $71a_5$ in rod section 71A, while the fluid chamber $R_2$ is connected to a port $71a_8$ of valve spool $71a_1$ through a radial hole $71c_4$ in rod section 71C and another axial passage $71a_7$ in rod section 71A.

Figure 7A:
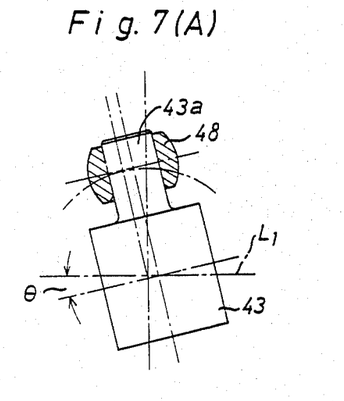
FIGS. 7(A) and 7(B) each illustrate conical movement of a connecting element shown in FIGS. 5 and 6.
Figure 7B:
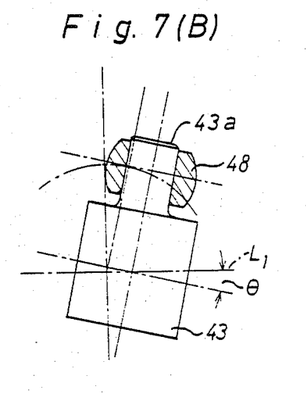
Figure 8:
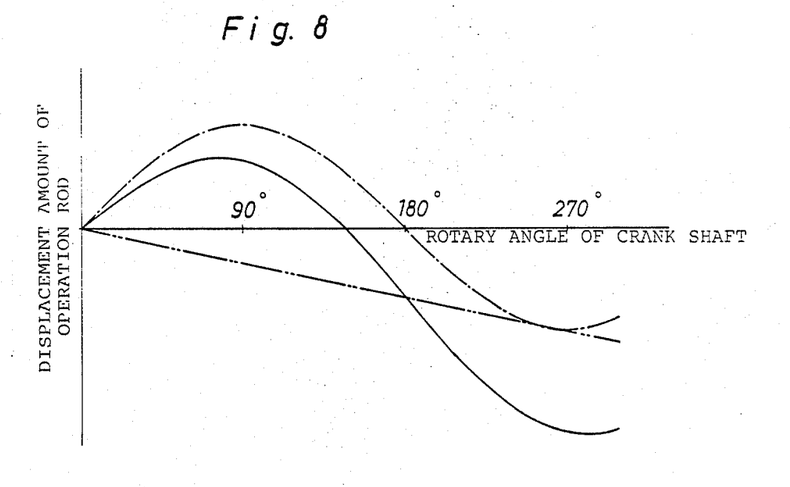
FIG. 8 is a graph showing a relationship between a rotary angle of a crank shaft in the connecting mechanism and an axial displacement amount of an operation rod in the rear wheel steering mechanism shown in FIG. 3.

Hereinafter, the operation of the four-wheel steering system will be described in detail. When the steering wheel WS is operated to turn the vehicle to the right or left, the rack bar 11 is displaced in a lateral direction to steer the front road wheels WF and to rotate the input shaft 41 of connecting mechanism A through the linkage 20. This causes rotary motion and axial displacement of the crank shaft 42 under the control of feed screw mechanism D. Assuming that the crank shaft 42 is rotated to the right at an angle of less than 90°, the connecting element 43 is swung in accordance with rotary motion of the crank shaft 42 and axially displaced in accordance with axial displacement of the crank shaft 42, as shown in FIG. 7(A). Assuming that the crank shaft 42 is rotated to the right at an angle of more than 180°, the connecting element 43 is swung in a reverse direction in accordance with rotary motion of the crank shaft 42 and axially displaced in accordance with axial displacement of the crank shaft 42, as shown in FIG. 7(B). Thus, the swing motion and axial displacement of connecting element 43 are transmitted to the operation rod 30 through the rotor assembly 44 to effect axial displacement of the operation rod 30. As shown by a solid curve in FIG. 8, the axial displacement amount of operation rod 30 is controlled in accordance with the rotary angle of crank shaft 42 to steer the rear road wheels WR in the same or the opposite direction as the front road wheels WF in dependence upon the turn-angle of the steering wheel WS. In FIG. 8, a dot-and-dash line represents the axial displacement amount of operation rod 30 caused by the swing motion of connecting element 43, and a two-dot chain line represents the axial displacement amount of operation rod 30 caused by the axial displacement of connecting element 43. The axial displacement of operation rod 30 is transmitted to the relay rod 71 through the coil spring 31 to cause relative displacement between the valve sleeve 34 and valve spool $71a_1$. As a result, the hydraulic power-assisted mechanism C is activated to provide a hydraulic power assist to the rear wheel steering linkage B.

In the connecting mechanism A described above, the axial displacement amount of operation rod 30 caused by rotary motion of the crank shaft 42 can be properly adjusted by alteration of the feed amount of crank shaft 42 per one rotation of the same and the inclined angle $\theta$ of pin portion $42a$ of crank shaft 42. This is useful to define an optimum steering angle of the rear road wheels relative to the front road wheels in accordance with the performance of the vehicle. The alteration of the feed amount of crank shaft 42 and the inclined angle $\theta$ of pin portion $42a$ can be made even in a limited space in the housing H without causing any difficulty in manufacturing process of the feed screw mechanism D and crank shaft 42. Furthermore, the component parts of connection mechanism A can be mounted within the housing H in such a simple manner as described above. In addition, it is noted that when the relay rod 71 is axially displaced by an external force applied thereto from the rear road wheels WR, the changeover valve $C_l$ is operated by the axial displacement of relay rod 71 to activate the hydraulic power cylinder $C_2$ so as to produce a counter force against the external force. This is useful to prevent undesired operation of the rear wheel steering mechanism caused by an external force acting thereon.

Figure 9:
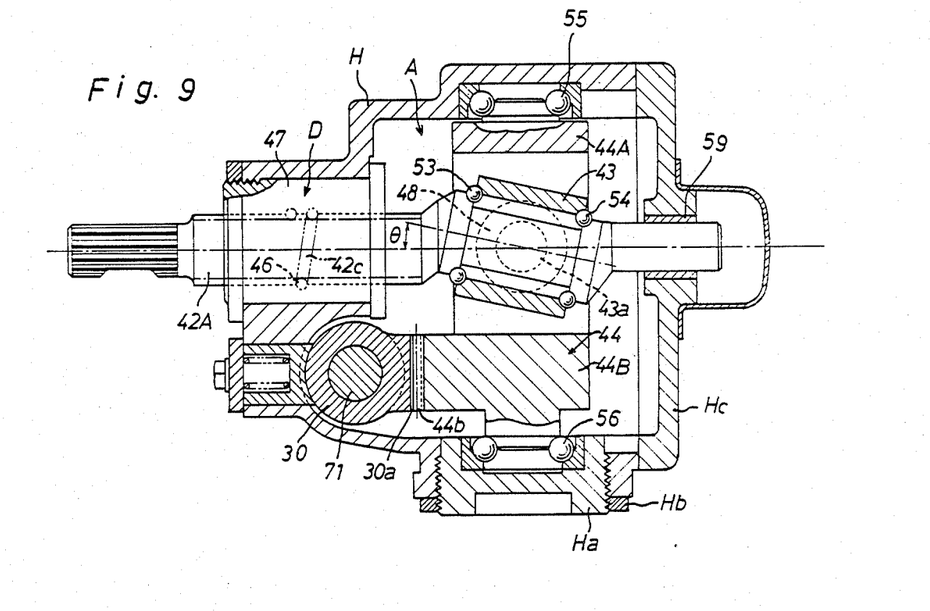
FIG. 9 is an enlarged cross-sectional view of a modification of the connecting mechanism shown in FIGS. 5 and 6.

In FIG. 9 there is illustrated a modification of the connecting mechanism A, wherein the feed screw mechanism D is replaced with the pair of axially spaced bearings 51, 52, and the input shaft 41 is eliminated. In this modification, a crank shaft 42A is axially slidably and rotatably supported at its front portion by means of the feed screw mechanism D and at its rear end portion by means of a bearing metal 59 carried on the cover member Hc. The crank shaft 42A is axially slidably connected at its front end to the rear end of intermediate shaft 23 of linkage 20 by means of a spline connection. Other construction and component parts are substantially the same as those in the connecting mechanism A shown in FIGS. 5 and 6.

Figure 10:
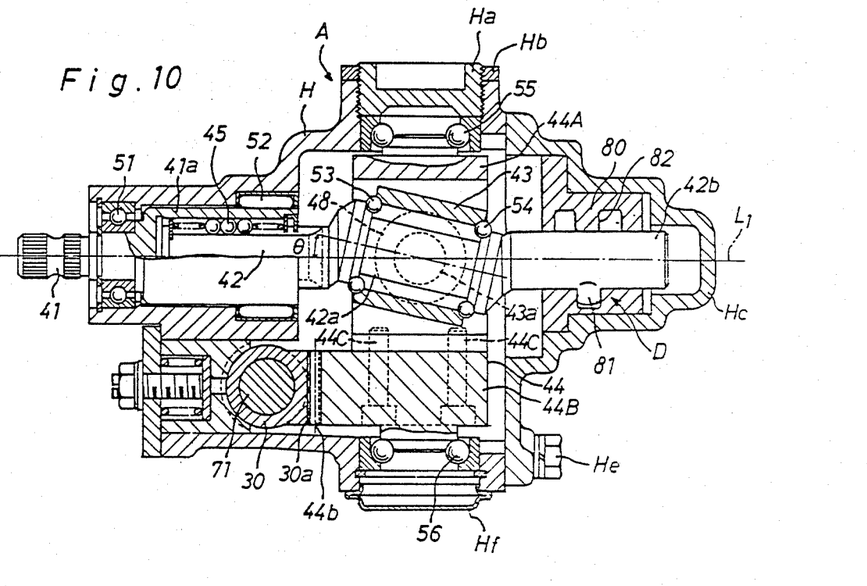
FIG. 10 is an enlarged cross-sectional view of another modiication of the connecting mechanism shown in FIGS. 5 and 6.

In FIG. 10 there is illustrated a modification of the feed screw mechanism D shown in FIGS. 5 and 6, wherein the crank shaft 42 is integrally formed at its rear end portion $42b$ with a radial projection 81 which is slidably engaged with a spiral groove 82 in a stationary support member 80. The support member 80 is coupled within the cover member Hc and retained in place by means of bolts (not shown) threaded therein through the cover member Hc. The spiral groove 82 has a first screw portion to be engaged with the radial projection 81 of crank shaft 42 when it is rotated from the neutral position to the left or right at an angle of less than 90° and has a second screw portion to be engaged with the radial projection 81 of crank shaft 42 when it is rotated from the neutral position to the left or right at an angle of more than 90°. In the spiral groove 82, the lead of the first screw portion is determined to be smaller than that of the second screw portion. Thus, a feed amount of crank shaft 42 caused by rotary motion of less than 90° is adjusted to be larger than that of crank shaft 42 caused by rotary motion of more than 90°. As a result, an axial displacement amount of operation rod 30 caused by rotary motion of crank shaft 42 at an angle of less than 90° is controlled in an appropriate value. This means that the rear wheel steering angle is restrained in an appropriate value when the steering wheel WS is turned at a small angle to steer the rear road wheels WR in the same direction as the front road wheels WF. Similarly, an axial displacement amount of operation rod 30 caused by rotary motion of crank shaft 42 at an angle of more than 90° is controlled in an appropriate value. This means that the rear wheel steering angle is restrained in an appropriate value when the steering wheel WS is turned at a large angle to steer the front and rear road wheels in opposite directions.

Figure 11:
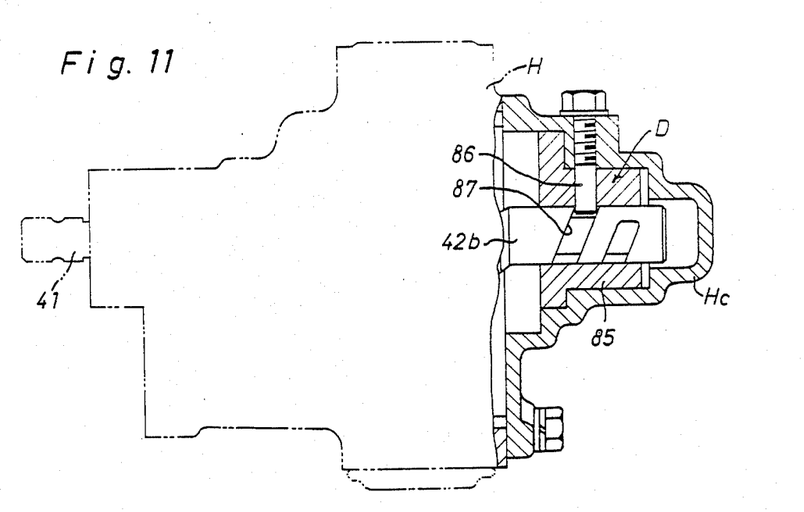
FIG. 11 is a fragmentary cross-sectional view of a modification of a feed mechanism in the connecting mechanism shown FIG. 10.

In FIG. 11 there is illustrated another modification of the feed screw mechanism D shown in FIGS. 5 and 6, wherein the crank shaft 42 is axially slidably and rotatably supported by a support member 85 which is coupled within the cover member Hc. In this modification, the crank shaft 42 is formed at its rear end portion 42b with a spiral groove 87 which is engaged with an inner end of a bolt 86 threaded in a radial direction into the support member 85 through an upper portion of cover member Hc. The spiral groove 87 has a first screw portion to be engaged with the inner end of bolt 86 when the crank shaft 42 is rotated from the neutral position to the left or right at an angle of less than 90° and has a second screw portion to be engaged with the inner end of bolt 86 when the crank shaft 42 is rotated from the neutral position to the left or right at an angle of more than 90°. In the spiral groove 87, the lead of the first screw portion is determined to be smaller than that of the second screw portion. Thus, a feed amount of crank shaft 42 caused by rotary motion of less than 90° is adjusted to be larger than that of crank shaft 42 caused by rotary motion of more than 90°. In such a modified construction of the feed screw mechanism D, the spiral groove 87 can be formed in a complicated configuration to alter the lead of groove 87 each at an appropriate angle, for instance, 45°.

Figure 12:
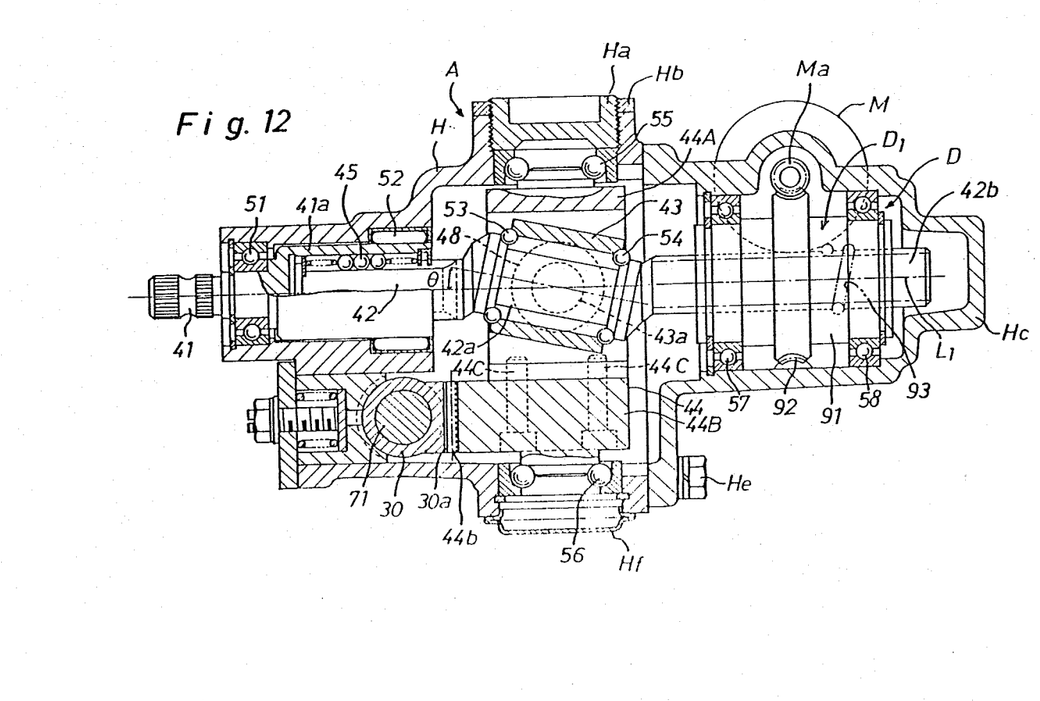
FIG. 12 is an enlarged cross-sectional view of a further modification of the connecting mechanism shown in FIGS. 5 and 6.
Figure 13:
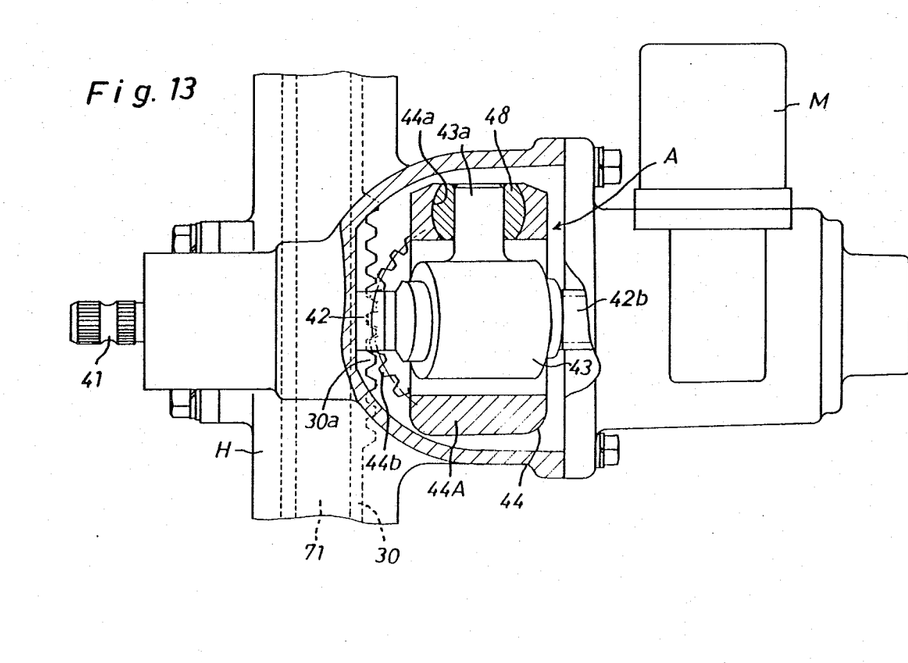
FIG. 13 is a fragmentary sectional plan view of the connecting mechanism shown in FIG. 12.

In FIGS. 12 and 13 there is illustrated a further modification of the feed screw mechanism D shown in FIGS. 5 and 6, which is in the form of a feed screw mechanism $D_1$ arranged to be driven by an electric motor M. The feed screw mechanism $D_1$ comprises a plurality of balls disposed within a spiral groove 93 formed on the rear end portion 42b of crank shaft 42, and a ball nut 91 coupled over the rear end portion of crank shaft 42 for relative rotation thereto and rotatably supported in place by a pair of axially spaced ball bearings 57, 58 carried within a cover member Hc of the housing H. The ball nut 91 has an axial bore formed with a spiral groove containing therein the balls and is formed thereon with a worm wheel 92 which is in mesh with a worm Ma fixed to an output shaft of motor M. The motor M is secured to one side of the cover member Hc and arranged to be activated in accordance with the rotary angle of crank shaft 42. In this modification, the electric motor M is maintained in a deactivated condition when the crank shaft 42 is rotated at an angle of less than 90° from the neutral position. When the crank shaft 42 is rotated at an angle of more than 90° from the neutral position, the electric motor M is activated to rotate the ball nut 91 in the same direction as the crank shaft 42 thereby to decrease the axial displacement amount of crank shaft 42. In the actual practice of the modified feed screw mechanism $D_1$, the electric motor may be replaced with a hydraulic cylinder. In such a case, the worm wheel 92 is replaced with a pinion formed on the ball nut 91, and a rack member in mesh with the pinion is arranged to be actuated by the hydraulic cylinder.

Figure 14:
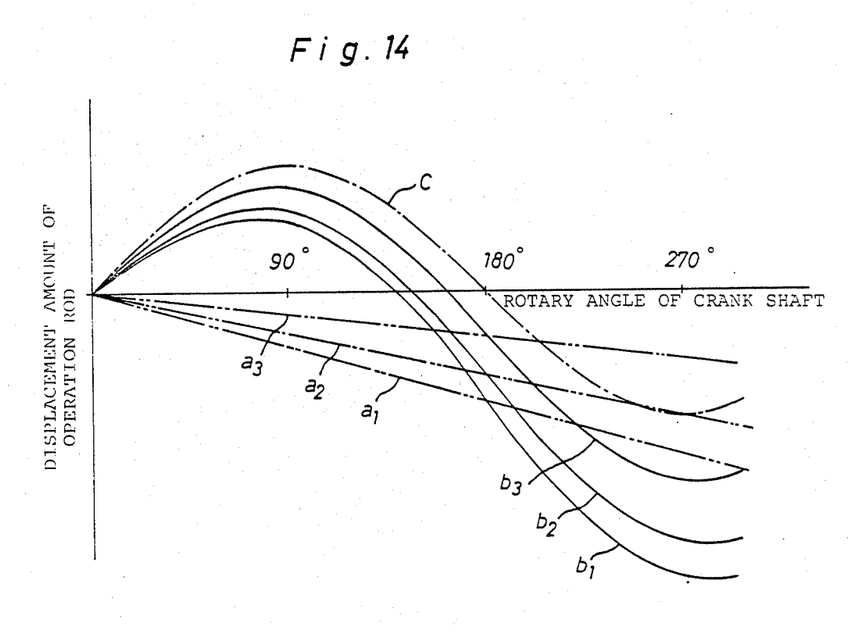
FIG. 14 is a graph showing a relationship between a rotary angle of a crank shaft shown in FIGS. 12 and 13 and an axial displacement amount of the operation rod in the rear wheel steering mechanism shown in FIG. 3.

Furthermore, the feed screw mechanism $D_1$ may be modified to control the feed amount of crank shaft 42 in accordance with the vehicle speed. In such a modification of the feed screw mechanism $D_1$, it is preferable that the electric motor M is arranged to be activated in accordance with the rotary angle of crank shaft 42 and the vehicle speed, as will be described hereinafter. During low speed travel of the vehicle, the electric motor M is activated to rotate the ball nut 91 in one direction thereby to adjust the feed amount of crank shaft 42 in a first predetermined value as shown by a first two-dot chain line $a_1$ in FIG. 14. During travel of the vehicle at a medium speed (for instance, 20 Km/h 60 Km/h), the electric motor M is maintained in a deactivated condition to adjust the feed amount of crank shaft 42 in a second predetermined value as shown by a second two-dot chain line $a_2$ in FIG. 14. In this instance, the feed amount of crank shaft 42 is determined by the lead of spiral groove 93. During travel of the vehicle at a high speed (for instance, more than 60 Km/h), the electric motor M is activated to rotate the ball nut 91 in the opposite direction thereby to adjust the feed amount of crank shaft 42 in a third predetermined value as shown by a third two-dot chain line $a_3$ in FIG. 14.

Under such a control of the electric motor M as described above, the displacement amount of operation rod 30 is adjusted during low speed travel of the vehicle in such a manner as to decrease the steering angle of the rear road wheels in the same direction as the front road wheels and to increase the steering angle of the rear road wheels in the opposite direction to the front road wheels. During high speed travel of the vehicle, the displacement amount of operation rod 30 is adjusted in such a manner as to increase the steering angle of the rear road wheels in the same direction as the front road wheels and to decrease the steering angle of the rear road wheels in the opposite direction to the front road wheels. Thus, it is possible to greatly improve maneuverability of the vehicle on narrow roads or when cornering on sharp curves during low speed travel and response of the vehicle when cornering on gentle curves during high speed travel.

Having now fully set forth both structure and operation of certain preferred embodiments of the concept underlying the present invention, various other embodiments as well as certain variations and modifications of the embodiments herein shown and described will obviously occur to those skilled in the art upon becoming familiar with said underlying concept. It is, therefore, to be understood that within the scope of the appended claims, the invention may be practiced otherwise than as specifically set forth herein.

What is claimed is:

1. A four-wheel steering system in a wheeled vehicle having a front wheel steering mechanism operable in response to the driver's effort applied to a steering wheel of the vehicle to steer a pair of dirigible front road wheels, comprising:

a rear wheel steering mechanism including an operation rod operatively connected at the opposite ends thereof to a pair of dirigible rear road wheels and axially movable in response to operation of said front wheel steering mechanism to steer the rear road wheels;

a linkage arranged in a fore-and-aft direction of the vehicle and having a front end drivingly connected to said front wheel steering mechanism; and a connecting mechanism assembled in combination with said rear wheel steering mechanism and being drivingly connected to a rear end of said linkage for effecting axial displacement of said operation rod in response to operation of said front wheel steering mechanism and for controlling the displacement direction of said operation rod in dependence upon a turn-angle of the steering wheel;

wherein said connecting mechanism comprises:

a housing mounted on a body structure of the vehicle for axially slidably supporting thereon said operation rod;

a crank shaft axially slidably and rotatably mounted within said housing and having a first end portion drivingly connected to the rear end of said linkage for rotation therewith, said crank shaft having an intermediate pin portion inclined at a predetermined angle with respect to the central axis thereof;

a feed mechanism assembled within said housing for effecting axial displacement of said crank shaft in accordance with rotary motion of the same; and a connecting element rotatably mounted on the inclined pin portion of said crank shaft and having a radial rod extending therefrom and operatively connected to said operation rod in such a manner as to effect axial displacement of said operation rod in response to rotary motion of said crank shaft and to control the displacement direction of said operation rod in accordance with the rotary angle of said crank shaft.

2. A four-wheel steering system as claimed in claim 1, wherein said crank shaft is arranged to rotate about a first horizontal axis perpendicular to the longitudinal axis of said operation rod, wherein a sector gear is pivotally mounted within said housing to rotate about a second vertical axis perpendicular to said first horizontal axis, said sector gear having a toothed portion in mesh with a rack portion formed on one side of said operation rod, and wherein a rotor member of semi-cylindrical shape is coupled with said sector gear in such a manner as to contain said connecting element therein and pivotally mounted within said housing to rotate about said second vertical axis, said rotor member being pivotally connected with the radial rod of said connecting element to be rotated by swing movement of said connecting element.

3. A four-wheel steering system as claimed in claim 1, wherein said feed mechanism is a feed screw mechanism which comprises a plurality of balls disposed within a spiral groove formed on a second end portion of said crank shaft, and a stationary ball nut mounted within said housing for axially slidably and rotatably supporting thereon the second end portion of said crank shaft, said ball nut having an axial bore formed with a spiral groove containing therein said balls.

4. A four-wheel steering system as claimed in claim 1, wherein said feed mechanism is a feed screw mechanism which comprises a plurality of balls disposed within a spiral groove formed on the first end portion of said crank shaft, and a stationary ball nut mounted within said housing for axially slidably and rotatably supporting thereon the first end portion of said crank shaft, said ball nut having an axial bore formed with a spiral groove containing therein said balls.

5. A four-wheel steering system as claimed in claim 1, wherein said feed mechanism is a feed screw mechanism which comprises a stationary support member mounted within said housing for axially slidably and rotatably supporting thereon a second end portion of said crank shaft, and a radial projection integrally formed on the second end portion of said crank shaft and being slidably engaged with a spiral groove in said support member.

6. A four-wheel steering system as claimed in claim 5, wherein the spiral groove in said support member has a first screw portion to be engaged with the radial projection of said crank shaft when it is rotated from a neutral position at an angle of less than a predetermined angle and has a second screw portion to be engaged with the radial projection of said crank shaft when it is rotated from the neutral position at an angle of more than the predetermined angle, the lead of said first screw portion being determined to be smaller than that of said second screw portion.

7. A four-wheel steering system as claimed in claim 1, wherein said feed mechanism is a feed screw mechanism which comprises a stationary support member mounted within said housing for axially slidably and rotatably supporting thereon a second end portion of said crank shaft, and a bolt threaded into said housing and having an inner end slidably engaged with a spiral groove formed on the second end portion of said crank shaft.

8. A four-wheel steering system as claimed in claim 7, wherein the spiral groove in the second end portion of said crank shaft has a first screw portion to be engaged with the inner end of said bolt when it is rotated from a neutral position at an angle of less than a predetermined angle and has a second screw portion to be engaged with the inner end of said bolt when it is rotated from the neutral position at an angle of more than the predetermined angle, the lead of said first screw portion being determined to be smaller than that of said second screw portion.

9. A four-wheel steering system as claimed in claim 1, wherein said feed mechanism is a feed screw mechanism which comprises a plurality of balls disposed within a spiral groove formed on a second end portion of said crank shaft, and a ball nut coupled over the second end portion of said crank shaft for relative rotation thereto and rotatably mounted in place within said housing, said ball nut having an axial bore formed with spiral groove containing therein said balls, and an actuator mounted on said housing for effecting rotation of said ball nut in accordance with rotary motion of said crank shaft.

10. A four-wheel steering system as claimed in claim 9, wherein said actuator is arranged to effect rotation of said ball nut in accordance with the rotary angle of said crank shaft and the vehicle speed.

11. A four-wheel steering system as claimed in claim 9, wherein said actuator is an electric motor mounted on said housing to be activated for effecting rotation of said ball nut in accordance with rotary motion of said crank shaft.

* * * * *